United States Patent [19]

Gross et al.

[11] Patent Number: 4,951,309

[45] Date of Patent: Aug. 21, 1990

[54] POWER-DOWN MODEM

[75] Inventors: Allen E. Gross, Carrollton; Said S. Saadeh, Plano; Lee F. McCrocklin, Carrollton, all of Tex.

[73] Assignee: Compaq Computer Corporation, Houston, Tex.

[21] Appl. No.: 257,953

[22] Filed: Oct. 14, 1988

[51] Int. Cl.$^5$ .......................................... H04M 11/00
[52] U.S. Cl. .......................................... 379/98; 375/8
[58] Field of Search .............................. 379/93, 95-98; 375/8

[56] References Cited

U.S. PATENT DOCUMENTS

| 3,549,809 | 12/1970 | Stehr | 179/2 |
|---|---|---|---|
| 4,051,326 | 9/1977 | Badagnani et al. | 179/2 DP |
| 4,415,774 | 11/1983 | Driver | 179/2 DP |
| 4,647,721 | 3/1987 | Busam et al. | 379/93 X |
| 4,654,869 | 3/1987 | Smith et al. | 379/93 X |
| 4,656,318 | 3/1987 | Noyes | 379/93 |
| 4,701,946 | 10/1987 | Oliva et al. | 379/98 |
| 4,723,269 | 2/1988 | Summerlin | 379/102 |
| 4,771,417 | 9/1988 | Maxwell et al. | 375/8 X |

FOREIGN PATENT DOCUMENTS 59-134967(A) 8/1984 Japan .

OTHER PUBLICATIONS

Macbride et al., "Remote Computer Power-On Via Switched Telephone Network", IBM Tech. Discl. Bull., vol. 25, No. 6, 11/82, p. 3056.

Primary Examiner—Keith E. George
Attorney, Agent, or Firm—Arnold, White & Durkee

[57] ABSTRACT

A modem capable of three modes of operation; a normal mode, a reduced power mode responsive to a control signal from a function controller within the modem, and a further reduced power mode responsive to a control signal from the computer. The function controller monitors activity within the modem and applies or removes power transparently as required to exit or enter the first reduced power mode. The control signal from the computer enables the modem to enter or exit the further reduced power mode, in which no modem functions are available.

6 Claims, 7 Drawing Sheets

POWER-DOWN MODEM

FIELD OF THE INVENTION

This invention relates generally to modems for data transmission across telephone lines. More specifically, this invention relates to the reduction of the power consumption of such devices.

BACKGROUND OF THE INVENTION

For data transmission on a standard voice grade telephone line a modem is employed to modulate data in a form suitable for transmission along the telephone line, and to demodulate data received from the telephone line to reproduce the data transmitted from a remote site. The modem requires a power supply for energizing its electronic circuits, usually an AC power outlet or a battery source.

Providing the power for a modem is generally not a problem with computers which themselves operate from an AC power outlet. However, for battery operated portable computers, providing the power for a modem can be a significant drain on the limited power stored in the battery. This is particularly true if the modem is expected to monitor incoming calls over a long time period.

The ability to detect an incoming call and notify the host computer is a vital link to the usability of a particular modem/computer combination in providing electronic mail and remote database accessing functions. Any networking, database showing or database updating system that relies on automatic dialing and answering between computers must have the ability to detect incoming calls, referred to as ring detection capability.

Another vital link is the capability to run standard application software on the host computer transparently and independently without additional control from the host computer.

Modems in the past have required power to be on in order to detect and notify the host that an incoming call is being received. In a battery-powered computer, this is a critical waste of power which makes the system unacceptable. For example, if a computer consumed 1.3 mW in its "standby" mode while awaiting incoming data, but used a modem which required 225 mW of power to monitor and detect incoming calls, a battery which could provide one year "standby" power for the computer alone would provide only 40 hours of "standby" power for the computer and the modem together. Thus adding a high power consumption modem to a portable computer may negate the carefully designed power saving features incorporated in the computer.

There have been several alternative approaches proposed to provide ring detection and notification capability in the past, generally requiring that the modems be powered.

Modems commonly used with computers cannot remove power from selective circuitry yet still be able to monitor incoming calls. Thus the host computer will not be notified of the occurrence of an incoming call unless full power is applied to the modem.

An alternative approach is to draw the operating power for the modem directly from the telephone lines rather than from the computer. Although this type of system does not deplete the computer's battery power, it suffers from other drawbacks. Federal regulations strictly limit the power that can be drawn from the telephone lines. This severely restricts the functions which a telephone line powered modem can perform. Typically, such modems are limited to low transmission rates in the range of 300 baud. Also, the power limitation prohibits implementation of the command set necessary to function as an "intelligent" modem.

An additional approach is to provide a control signal from the computer to the power supply section of the modem. When the modem is required, the computer provides the control signal to apply power to the modem. When the modem is no longer needed, the computer removes the control signal to remove power. However, the time required for the computer to apply power to the modem can cause the execution of a software application on the computer to be unnecessarily delayed. Also, there are circumstances when the computer does not know that power should be applied to the modem, such as the occurrence of incoming calls.

It would be desirable for a modem to be able to enter a reduced power mode and be able to detect incoming calls and computer commands while in this mode. It would also be desirable for a modem to draw power from the computer to allow transmission at all baud rates and to allow the modem to function as an "intelligent" modem. It would also be desirable for a modem to be immediately accessible without having to wait for a control signal from the computer. It would also be desirable for a modem to be able to enter or exit from a reduced power mode in a manner transparent to the computer.

SUMMARY OF THE INVENTION

The present invention provides a modem which receives power from the computer and which operates in three modes: full power, standby, and power down. The modem changes between full power and standby modes responsive to a control signal from a function controller within the modem itself. During the standby mode, the modem is able to detect incoming calls and computer commands. The function controller monitors the activity of the modem and applies or removes power as required by the modem to send data across a telephone line or to receive data from an incoming call. If the modem is not required by the computer for an extended period of time, the modem may enter power down mode responsive to a control signal from the computer. During the power down mode, ring detection is not possible and the modem is not available to the computer. The power down control signal must be removed for the modem to return to operation.

BRIEF DESCRIPTION OF THE DRAWINGS

A written description setting forth the best mode presently known for carrying out the present invention, and of the manner of implementing and using it, is provided by the following detailed description of a preferred embodiment illustrated in the attached drawings wherein.

DESCRIPTION OF A PREFERRED EMBODIMENT

Figure 1:
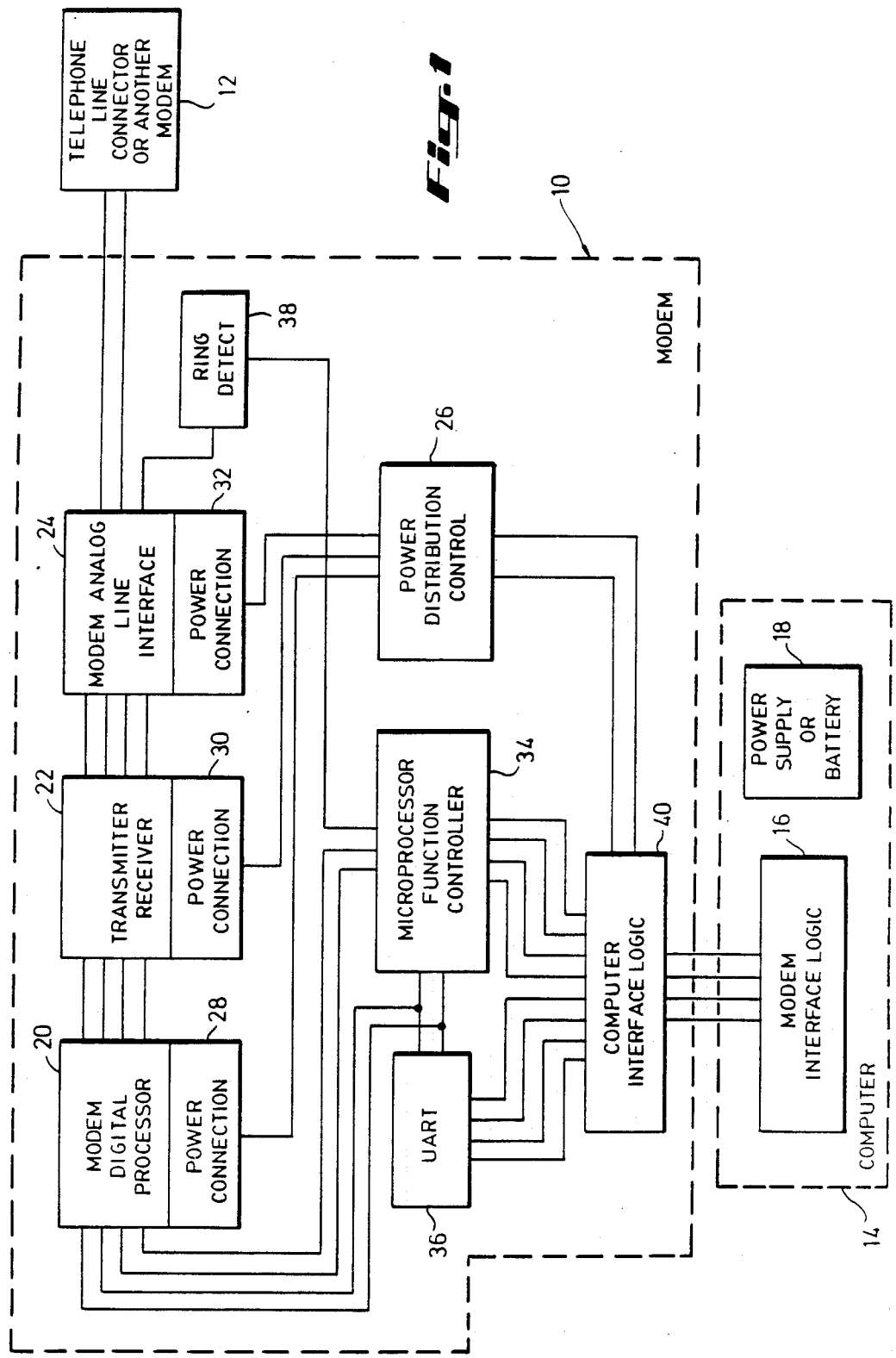
FIG. 1 is a schematic block diagram of a modem which embodies the invention, and its interconnections to a computer and to a telephone line.

Referring to FIG. 1, a block diagram of the primary components of a preferred embodiment of the present invention is shown. The modem 10 has interface connections to a telephone line 12 and a computer 14.

The computer 14 contains logic 16 necessary to interface with the modem 10 and also contains a power supply 18. The power supply 18 can be a battery or standard AC power and is used by the computer 14 to provide power to the modem 10.

The modem 10 comprises a digital signal processor 20, an analog transmitter/receiver 22, and an analog line interface 24. These sections perform the modulating and demodulating of data signals and are herein referred to as the controlled power sections of the modem 10. The controlled power sections receive power from a power distribution controller 26 at respective power connections 28, 30, and 32. The modem 10 further comprises a microprocessor function controller 34 which is capable of entering and sustaining a standby state, a UART serial-to-parallel signal converter 36, and a ring detector 38. In addition, the modem 10 contains logic 40 necessary to interface with the computer 14. All modem devices except the controlled power sections receive power directly from the power supply 18 of the computer 14.

Figure 2:
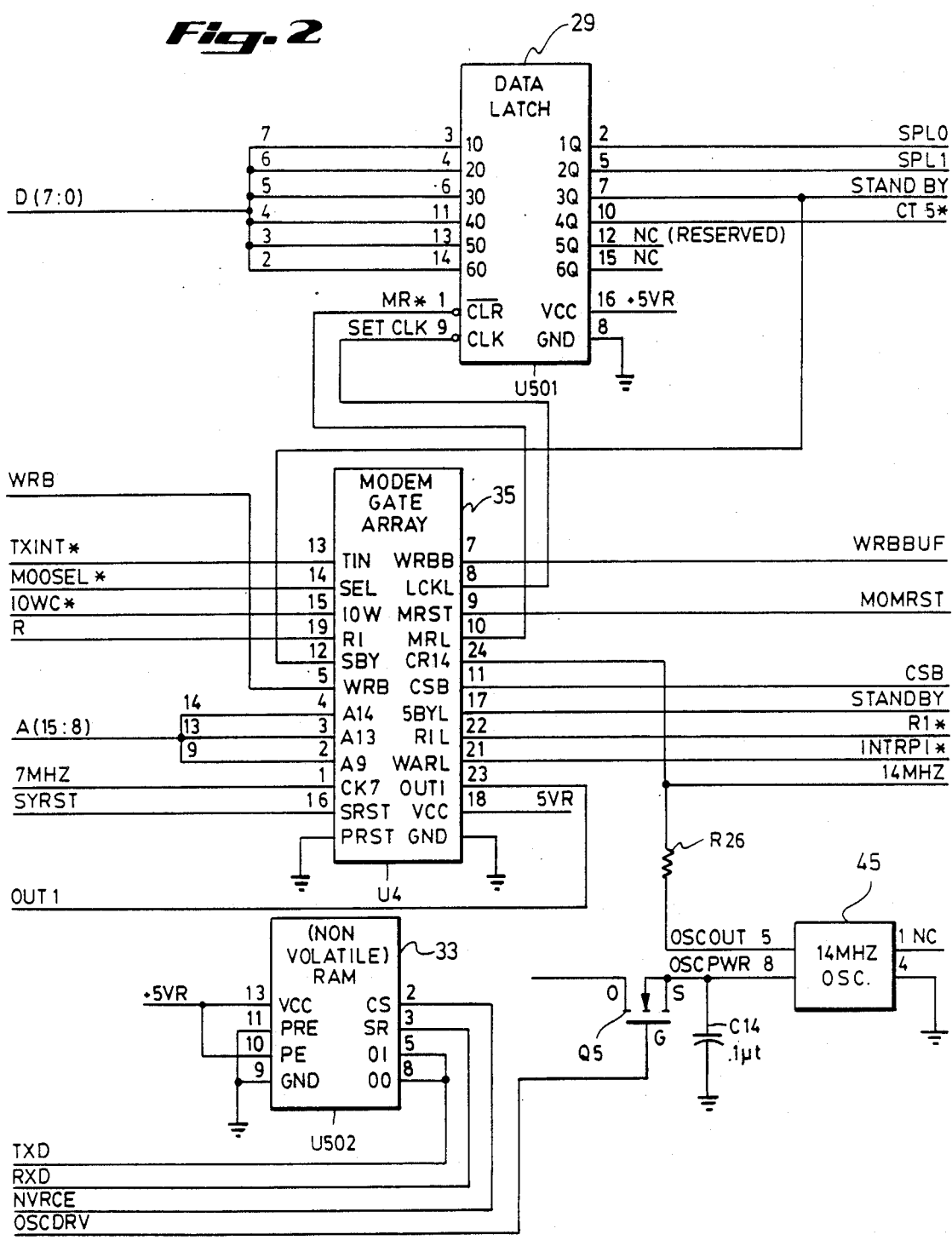
FIG. 2 is a detailed schematic diagram of the support circuitry for the microprocessor function controller of the modem of FIG. 1.

Referring now to FIG. 2, a diagram of the logic support circuitry of the function controller 34 is shown. The circuit comprises a data latch 29 with input from a data bus D and output to signal lines SPL0 and SPL1 to control speaker volume, STANDBY to indicate that the modem is in standby mode, and CTS to carry a clear to send signal to the UART 36. The circuit further comprises a fourteen MHz oscillator 31 which serves as a master system clock. A nonvolatile RAM 33 is provided to store user settings and one telephone number. A modem gate array 35 performs address decoding, clock dividing, system resetting, and buffering of various control signals. Control signal buffering is necessary to prevent chip damage due to CMOS latchup, and will be described later.

The modem gate array 35 has inputs including lines for a write buffer signal WRB, a transmit interrupt signal TXINT*, a modem select signal MODSEL*, an I/O write signal IOWC, a ring indicator signal RI, a data bus A, a seven MHz clock, and a system reset signal SYSRST. The outputs of the modem gate array 35 include lines for a tristated write buffer signal WRBBUF, a modem reset signal MDMRST, an address decode signal CSB, a standby signal STANDBY*, an interrupt signal INTRPT*, and a ring indicator signal RI*. The modem gate array 35 is implemented by a Fujitsu AVB series gate array having 350 logic gates. In the preferred embodiment, the nonvolatile RAM 33 is implemented using a National NMC9346 chip. The clock 31 and the data latch 29 may be implemented in a variety of ways and are well known to those skilled in the art.

Figure 3:
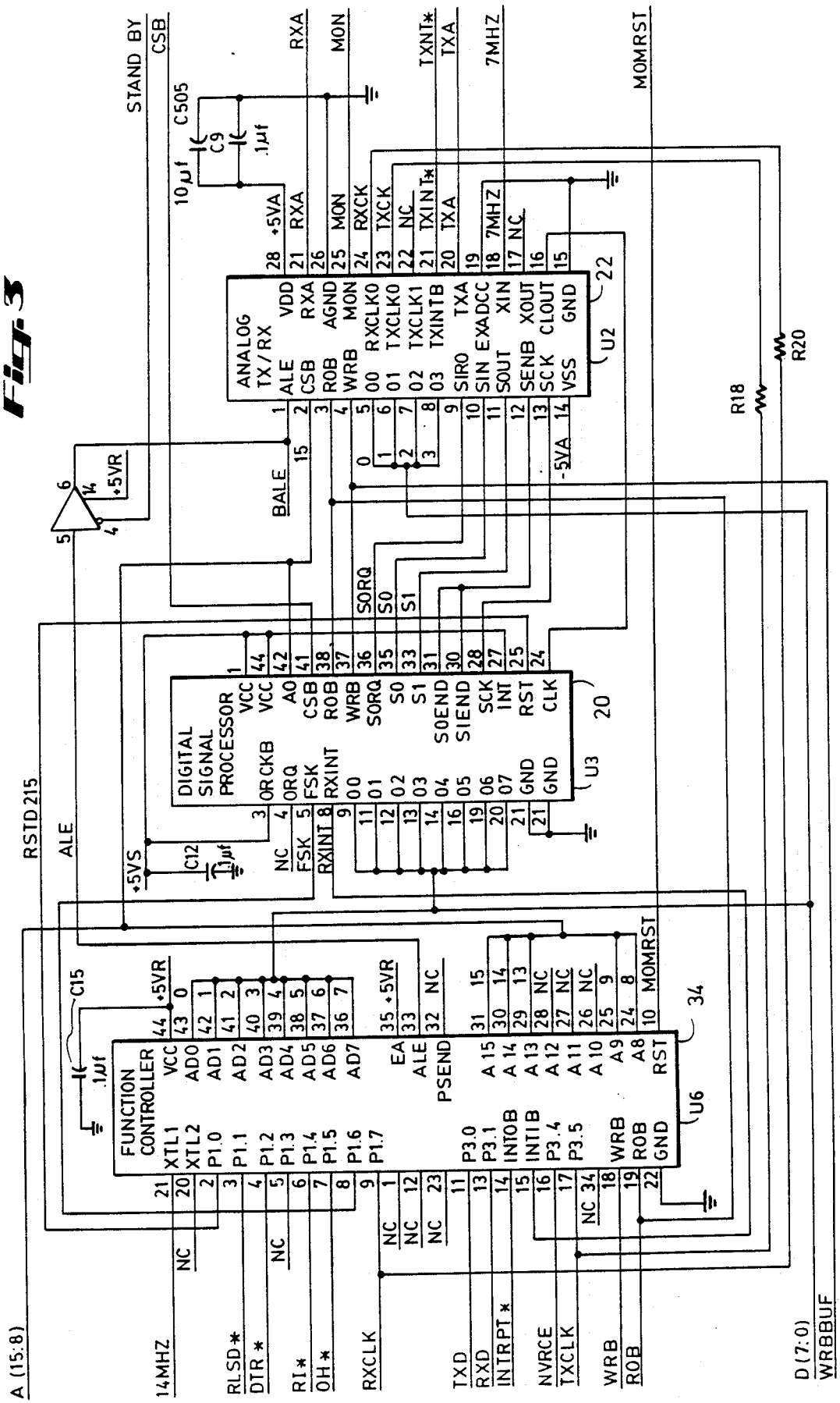
FIG. 3 is a detailed schematic diagram of the connections between the microprocessor function controller, the digital signal processor, and the analog transmitter/receiver of FIG. 1.

Referring now to FIG. 3, a diagram of the interconnections between the function controller 34, the digital signal processor 20, and the analog transmitter/receiver 22 is shown. The function controller 34 monitors the activity of the modem 10 and contains means to apply power to, or remove power from, the controlled power sections. Inputs to the function controller 34 include lines for a fourteen MHz clock, a data carrier detector signal RLSD*, a data terminal ready signal DTR*, the ring indicator signal RI*, an off hook signal OH*, transmit data and receive data signals TXD and RXD, the interrupt signal INTRPT*, a nonvolatile RAM chip enable signal NVRCE, and the write buffer signal WRB. The function controller 34 outputs signals onto data busses A and D which serve as the main inputs to the digital signal processor 20 and the analog transmitter/receiver 22. The digital signal processor 20 and the analog transmitter/receiver 22 work together to perform the modulating and demodulating of data signals in the modem 10. The analog transmitter/receiver 22 contains filters to perform analog frequency differentiation of received and transmitted signals. The digital signal processor 20 integrates these signals to complete the necessary signal processing. The outputs of the analog transmitter/receiver 22 include a receive line RXA, a speaker monitor line MON, the transmit interrupt line TXINT*, a transmit line TXA, and a seven MHZ clock. In the preferred embodiment, the function controller 34 is implemented using an OKI 83C154 microprocessor. The digital signal processor 20 and the analog transmitter/receiver 22 are implemented using Silicon Systems Inc. chips 73D215 and 73A214 respectively.

As stated previously, buffering of some signals is necessary to avoid chip damage due to CMOS latchup. The CMOS latchup effect can occur when the inputs of CMOS devices draw too much current. To prevent latchup, several signal lines in FIG. 2 and FIG. 3 are protected. Specifically the write signal WRBBUF is a tristated signal substantially the same as write signal WRB. During standby and power down, the line which carries the WRBBUF signal is in a high impedance state in order to avoid latchup upon applying power to the device. Likewise, the 7 MHz clock signal of FIG. 2 is a tristated signal that is in a high impedance state during standby and power down modes in order to avoid latchup. Additionally the line carrying the address latch enable signal ALE between the devices of FIG. 3 is protected by way of a tristate buffer to prevent chip damage during power up.

Figure 4:
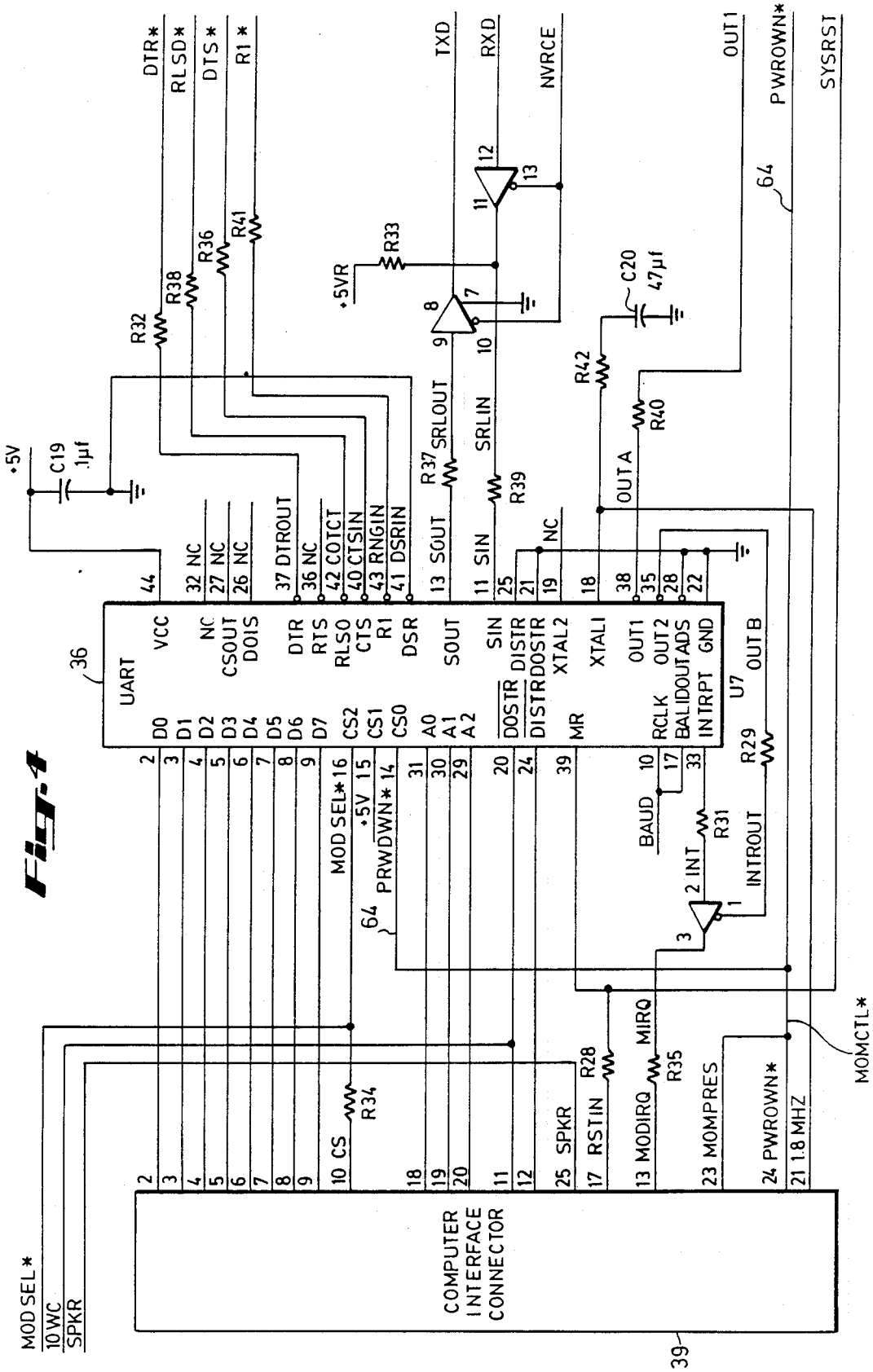
FIG. 4 is a detailed schematic diagram of the connections between the UART and the computer interface logic of the modem of FIG. 1.

Referring now to FIG. 4, a diagram of the UART 36 and a computer interface connector 39 is shown. The UART 36 converts data signals transmitted in series to signals transmitted in parallel. In the preferred embodiment, the UART 36 is a standard CMOS 16C450 UART known to those skilled in the art.

Figure 5:
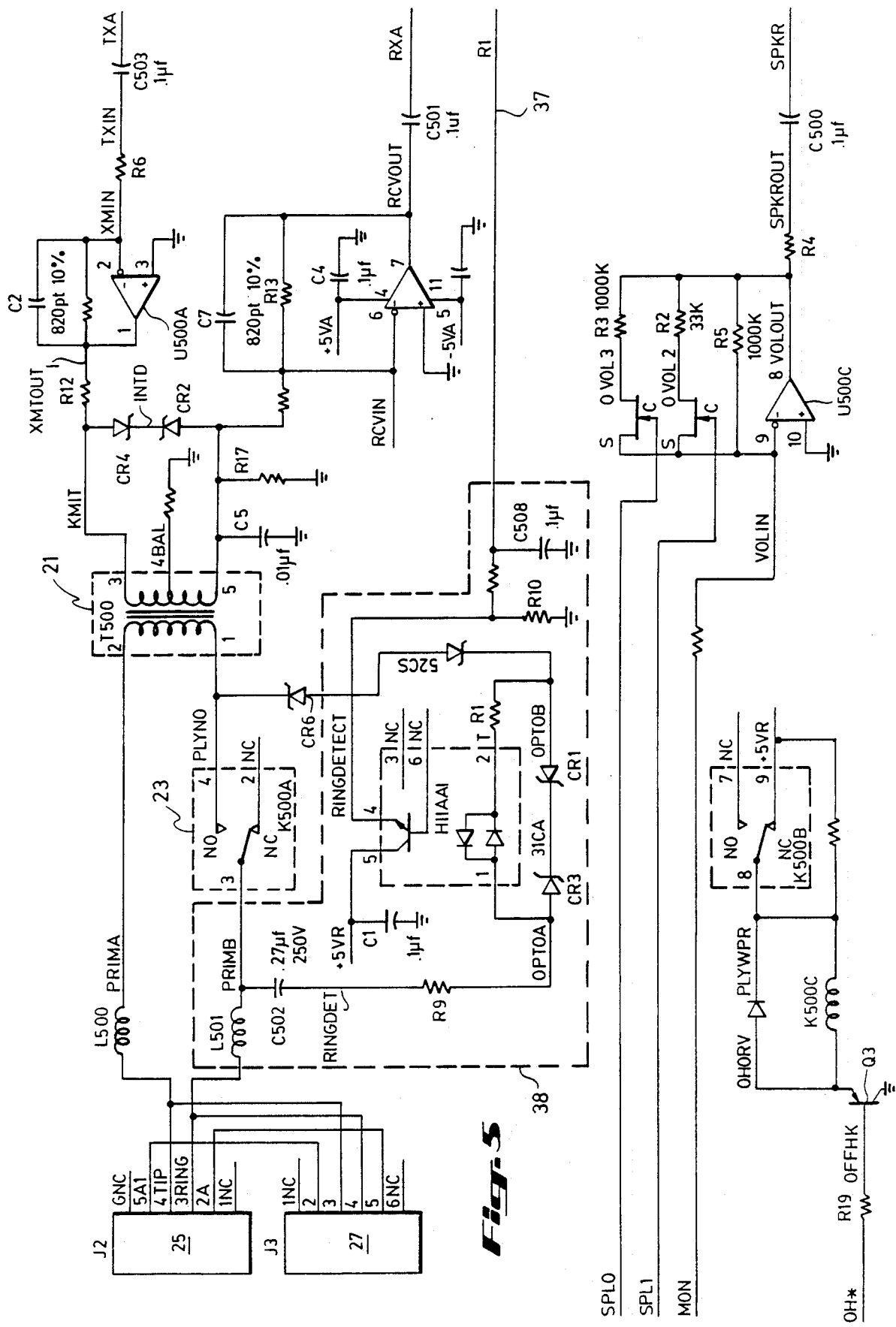
FIG. 5 is a detailed schematic diagram of the analog line interface and the ring detector of the modem of FIG. 1.

Referring now to FIG. 5, a diagram of the analog line interface 24 and the ring detector 38 is shown. The analog line interface 24 has connections to the telephone line 12 at phone jacks 25 and 27 and connections to the analog transmitter/receiver 22 by way of the transmit line TXA and the receive line RXA. These lines are connected to the analog line interface 24 by way of the transmit and receive circuits, respectively. Lines from the transmit and receive circuits interface with lines from the phone jacks 25 and 27 and the ring detector 38 at a transformer 21. The ring detector 38 notifies the function controller 34 of incoming calls via the ring indicator line RI and signals that the modem 10 requires full power. The analog line interface 24 further includes the speaker volume control lines SPL0 and SPL1 from the data latch 29 and the speaker monitor line MON from the analog transmitter/receiver 22. Also, the analog line interface 24 includes the off-hook signal line OH*. The off-hook circuit includes a relay 23 which in the preferred embodiment is an Aromat relay. The transformer 21 is a Midcon magnet transformer in the preferred embodiment.

Referring again to FIG. 1, the modem 10 has three modes of operation: normal, standby, and power down. In the normal mode, all modem devices are fully powered. While in the normal mode, the function controller 34 executes an algorithm to determine the activity of the modem 10 and enters the standby mode if power to the controlled powered sections is unnecessary. In the standby mode, the controlled power sections are unpowered, the function controller 34 operates in a low power state, and an interrupt line from the function controller 34 monitors signals from the computer interface logic 40 and the ring detector 38. If an interrupt signal occurs, indicating an incoming call or a command from the computer 14, the function controller 34 will exit from standby mode and apply power to the controlled power sections to return to normal mode and enable the modem to respond to the expected activity.

To enter the power down mode, the modem 10 must receive a power down signal from the computer 14. During this mode, all modem circuits are unpowered except for the UART 36 and the necessary computer interface logic 40. Because the UART 36 shares the same bus interface logic with the computer 14, the UART 36 must always remain powered so as not to interfere with the computer's activities. The power down mode is entered only when the computer 14 has no need for the functions of the modem 10. Ring detection may not occur during the power down mode, and the UART 36 may not be accessed by the computer 14. The power down signal from the computer 14 must be removed before the modem 10 can be used again.

Figure 6:
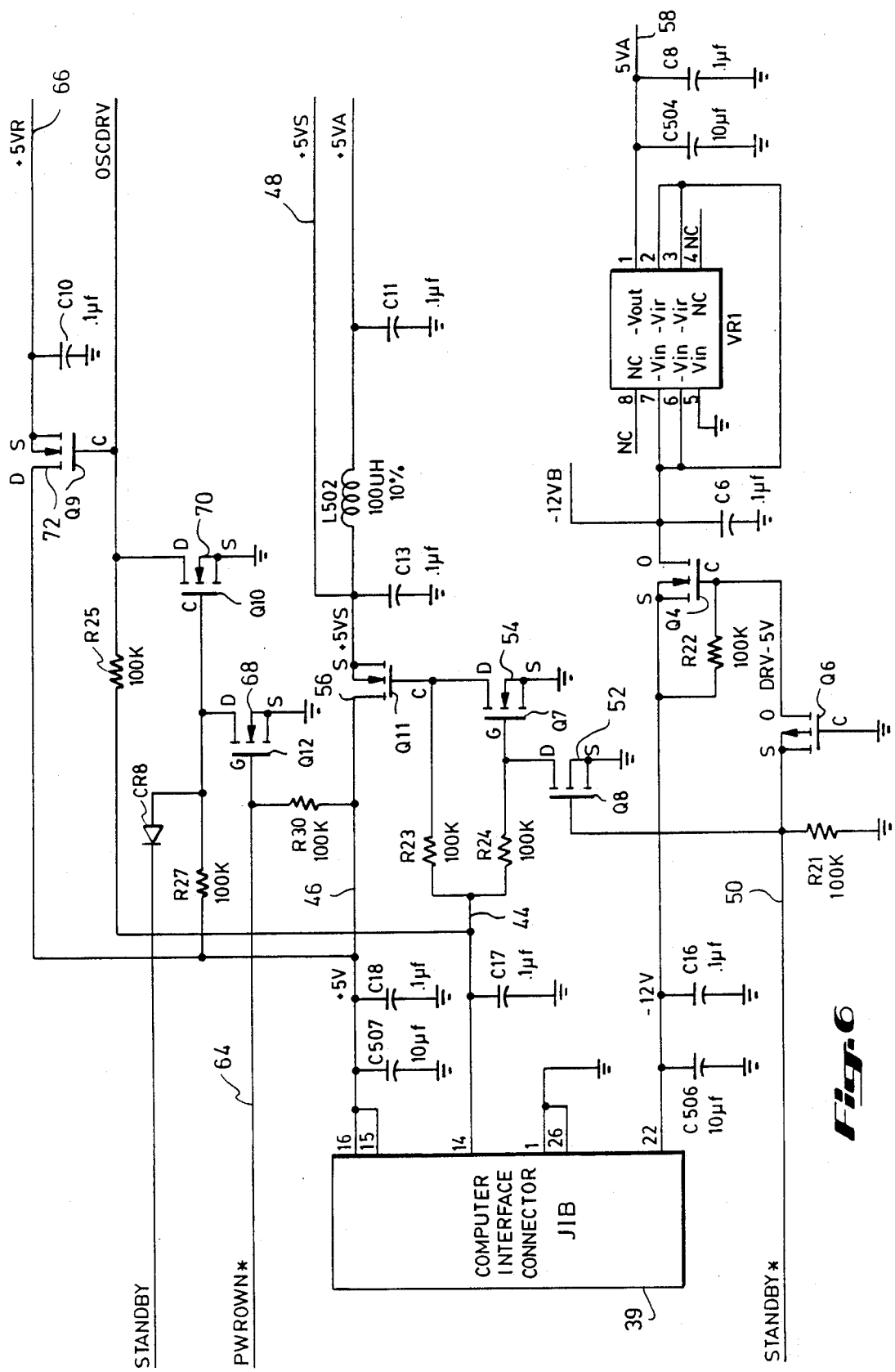
FIG. 6 is a detailed schematic drawing of the power distribution control circuit of the modem of FIG. 1.

Referring now to FIG. 6, a detailed schematic diagram of the power distribution controller 26 is shown. The power distribution controller 26 uses FET transistors of the type normally found in low current switching circuits known to those skilled in the art. The power distribution controller 26 receives power from the power supply 18 of computer 14 via computer interface connector 39 and over lines 44 and 46. The controlled power devices which require a switched five volt power supply receive power over line 48. All other modem devices except the UART 36 receive power over line 66.

To enter the standby mode, the switched five volt power supply on line 48 is controlled by the standby control input 50 from the function controller 34. To supply voltage to the controlled power sections, the function controller 34 supplies five volts to the standby control input 50. This turns on FET 52 and turns off FET 54. At this time, the twelve volt line 44 is used to drive FET 56 to a fully conducting state, which supplies five volts to line 48, the switched positive supply voltage. This voltage may be removed when the function controller 34 enters the standby mode and removes the voltage from the standby control input 50. A similar arrangement is used to supply a switched negative supply voltage to the controller power sections on line 58.

To enter the power down mode, the power supplied over line 66 is controlled by the power down signal line 64. The signal line 64 is connected to the computer interface logic 40 and the UART 36 at one end and to the power distribution controller 26 at the other end. The signal line 64 is connected to the UART 36 at a chip select pin 62, as shown in FIG. 4. This connection serves to deselect the UART 36 whenever the power down mode is entered, thereby making the UART 36 inaccessible to the computer 14 during the power down mode. Referring again to FIG. 6, the power down signal controls the voltage level to the signal line 64. When voltage is supplied, FET transistor 68 is turned on and FET 70 is turned off. Now the twelve volt supply on line 44 is used to drive FET 72 to a fully conducting state, which supplies voltage over line 66. This voltage is removed when the computer 14 removes the voltage from the signal line 64.

Figure 7:
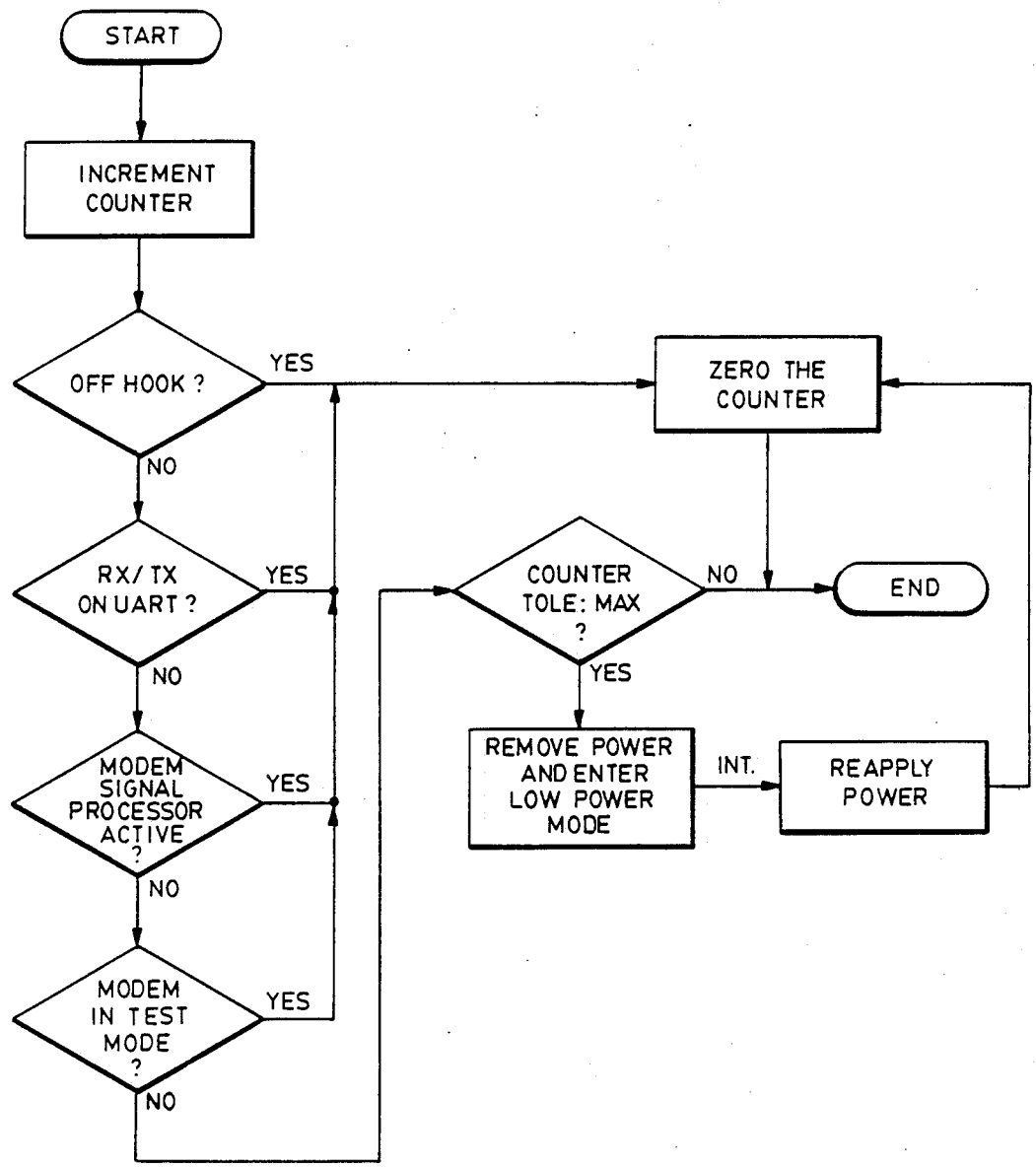
FIG. 7 is a flow chart diagram illustrating the algorithm used to determine the power requirements of the modem.

Referring to FIG. 7, a flow chart of the algorithm used to determine the power requirements of the modem 10 is shown. The algorithm is embodied in a set of coded instructions (i.e.,a program) stored in a memory within function controller 34. Means for accessing the memory and executing this algorithm are contained in microprocessor function controller 34. The algorithm is executed while the function controller 34 is waiting for commands from the computer 14. Each time the algorithm is run, a counter is incremented. If the modem 10 is active, the counter is zeroed. The function controller 34 recognizes activity in the modem 10 when: the modem 10 is off-hook, the UART 36 is receiving or transmitting signals, the modem digital signal processor 20 is active, and when the modem 10 is in its test mode. If the modem 10 is not active, the counter is not zeroed and continues to be incremented. If the counter reaches a predetermined maximum value, the function controller 34 will remove power from the controlled power sections and enter the standby mode. If activity which requires a response from the modem 10 occurs, the function controller 34 will return to normal mode, reapply power to the controlled powered sections of the modem 10, zero the counter, and begin to execute the algorithm of FIG. 7.

The foregoing description of the invention has been directed to a particular preferred embodiment for purposes of explanation and illustration. It will be apparent, however, to those skilled in this art that many modifications and changes may be made without departing from the essence of the invention. It is the Applicant's intention in the following claims to cover all equivalent modifications and variations as fall within the scope of the invention.

What is claimed is:

1. Apparatus for communication of data signals between a telephone network and a data terminal, comprising:
   a first interface connectable to the telephone network;
   a second interface connectable to the data terminal;
   means, including a digital signal processor and an analog receiver/transmitter, for providing modulation and demodulation to data signals being passed between the first and second interfaces in a state of modem activity;

a power distribution controller providing operating power to the modulation and demodulation means; and a function controller monitoring modem activity and causing the power distribution controller to remove operating power from the modulation and demodulation means upon determining an absence of activity in the digital signal processor, in the analog receiver/transmitter, and on the telephone network;

the function controller being responsive to an interrupt signal from the second interface to cause operating power to be reapplied to the modulation and demodulation means, the power distribution controller removing and reapplying operating power to the modulation and demodulation means without interruption of a supply of power to the data terminal.

2. The apparatus of claim 1 further comprising:

a ring detector monitoring signal activity at the first interface to determine the presence of an incoming signal from the telephone network and provide a ring signal to the function controller;

the function controller being responsive to the ring signal to cause operating power to be reapplied to the modulation and demodulation means.

3. The apparatus of claim 1 further comprising:

an interconnection of the power distribution controller to the second interface, for coupling power supplied from the data terminal.

4. The apparatus of claim 1 wherein the function controller includes a memory having a set of coded instructions stored therein, said instruction set being executed to provide a determination of an absence of modem activity based upon a predetermined count value being attained as a result of repeated executions of the instruction set without detection of modem activity.

5. The apparatus of claim 1 wherein the function controller includes a memory having a set of coded instructions stored therein, said instructions causing a counter to increment each time said instructions are executed during a state of modem inactivity, said counter reaching a maximum value to indicate that full power is not required and said counter being zeroed to indicate that full power is required.

6. The apparatus of claim 1 wherein the function controller includes means for causing the power distribution controller to remove operating power from, or reapply operating power to, the modulation and demodulation means in a manner transparent to the data terminal.

* * * * *